June 14, 1960
L. W. LERCH
2,940,721
ELECTRIC HOIST CAPACITOR MOUNT
Filed Dec. 13, 1955
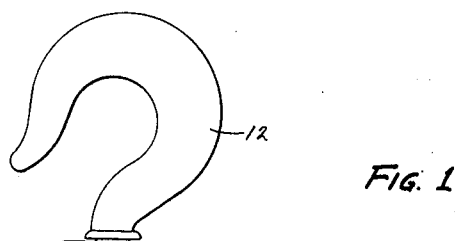
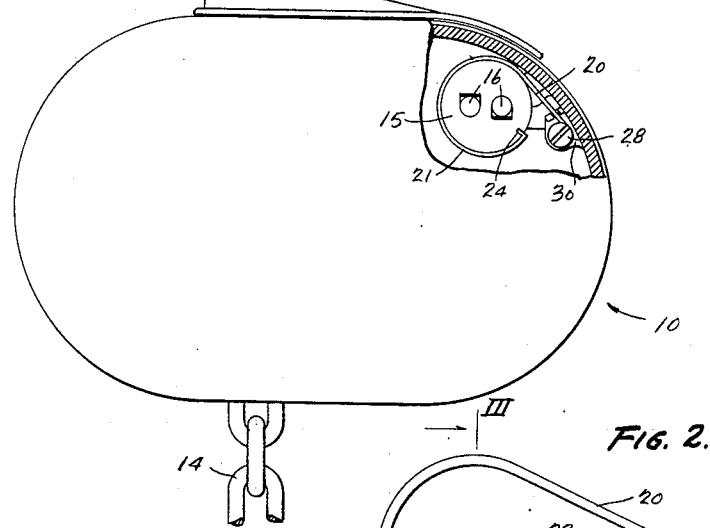
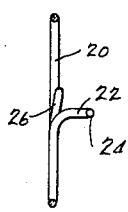
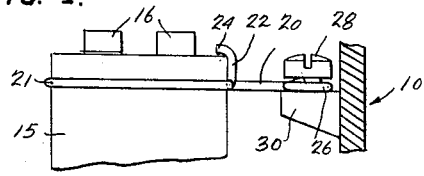
INVENTOR
LOREN W. LERCH
BY
Beau, Brooks, Buckley, Beau.
ATTORNEYS

United States Patent Office 2,940,721
Patented June 14, 1960

2,940,721

ELECTRIC HOIST CAPACITOR MOUNT

Loren W. Lerch, Buffalo, N.Y., assignor to Columbus McKinnon Chain Corporation, Tonawanda, N. Y.

Filed Dec. 13, 1955, Ser. No. 552,937

5 Claims. (Cl. 248—316)

This invention relates to electric hoists, and more particularly to improvements in means for mounting operative components thereof interiorly of the housing or frame structures of electric hoists, or the like.

One of the objects of the invention is to provide in an electric hoist, improved means for mounting a standard capacitor or condenser cell interiorly of the electric hoist housing.

Another object of the invention is to provide an improved mounting means as aforesaid which comprises a simple, novelly bent spring wire which is easily fabricated and installed in the hoist frame, and which facilitates assembly and disassembly of the mounted capacitor with utmost ease of operation.

Other objects and advantages of the invention will appear in the specification hereinafter.

In the drawing:

Fig. 1 is a fragmentary side elevational view, partly in section, of an electric hoist having mounted therein a circuit control capacitor carried by means of a mounting device of the present invention;

Fig. 2 is an enlarged elevational disassembled view of the mounting spring device of Fig. 1;

Fig. 3 is a sectional view taken along line III—III of Fig. 2; and

Fig. 4 is a fragmentary side elevational view of the capacitor and mounting device of Fig. 1.

In the drawings the invention is illustrated as being embodied in a hoist frame designated generally at 10 arranged to be supported by a suspension hook 12 and carrying a load lift chain 14, as is conventional in the art. The capacitor to be mounted within the hoist housing is indicated at 15 and is of simple cylindrical form having terminals 16—16 for connection to conductors leading to the motor control circuit (not shown). The mounting device as shown in the drawing herewith comprises a single wire spring member 20 having a central circular body portion 21 dimensioned to encircle the capacitor 15 and terminating at one end in a right angle bent guide portion 22 at the extreme end of which is an inturned tip portion 24 adapted to overhang the end of the capacitor 15 when mounted therewithin. The other end of the spring wire 20 extends tangentially from the circular portion 21 of the spring member into a terminal eye portion 26 adapted to be engaged by fastening means such as a machine screw 28 threaded into a tapped opening in a bracket portion 30 of the hoist frame or housing 10.

Preferably, as illustrated in Figs. 3, 4, the extreme tip end portion of the eye portion 26 is slightly upset out of the general plane of the eye portion 26 so as to be adapted to function as a spring-lock washer under the cap of the machine screw 28 when the latter is tightened down upon the mounting device. Thus, it will be appreciated that the capacitor mounting device of the invention comprises a single readily fabricated coil spring device mountable at one end upon the hoist frame and adapted to engage its circular body portion upon the cylindrical wall of a capacitor or condenser or the like, so as to mount the latter interiorly of the hoist frame. The retaining tip end portion 24 of the mounting wire device is elastically deformable out of holding position so as to permit assembly and disassembly of the capacitor relative to the mounting device, although it will be appreciated that unintended dismounting of the capacitor is avoided by means of the resiliency of the wire member 20 and the shape of the latter in relation to the mounted capacitor.

Although only one specific form of the invention has been shown and described in detail, it will be apparent to those skilled in the art that the invention is not so limited but that various changes may be made therein without departing from the spirit of the invention or the scope of the appended claims.

What is claimed is:

1. In combination, an electric hoist including a hollow frame housing, a cylindrical component disposed interiorly of said housing, a mounting device holding said component in a predetermined position interiorly of said housing, said mounting device comprising a spring wire member having a circularly shaped body portion defining the general plane of said member and embracing a cylindrical side wall portion of said component, said member terminating at one end in a laterally bent guide portion extending along said side wall portion and leading to an inwardly bent tip end portion overhanging one end of said component when the latter is embraced within said circular body portion, the other end of said wire member extending tangentially from said body portion and terminating in a bent eye formation, and fastening means engaging said eye formation and mounting the same firmly against said hoist frame housing, the extreme end portion of said eye formation being upset from said general plane of said wire member so as to funciton as a spring lock washer for such fastening means.

2. In combination, an electric hoist including a housing, a circularly shaped electrical hoist component disposed interiorly of said housing, and a mounting device holding said component in predetermined position relative to said housing, said mounting device comprising a single spring wire member having a circularly shaped body portion formed by a single convolution embracing said component with one end thereof extending laterally lengthwise of said component and terminating in a hook shaped end portion overhanging one end of said component, the other end of said wire member being extended from said body portion thereof and terminating in a bent eye portion engaged by means mounting said eye portion firmly against said hoist housing.

3. In combination, an electric hoist including a hollow housing, a cylindrical component disposed interiorly of said housing, and a mounting device holding said component in predetermined position interiorly of said housing, said mounting device comprising a spring wire member having a circularly shaped body portion formed by a single convolution embracing said component and terminating at one end in a hook shaped end portion extending lengthwise of said component and overhanging one end thereof when said component is embraced within said circular body portion, the other end of said wire member being extended from said body portion and terminating in a bent eye portion, and screw means engaging said eye portion and mounting said device againt said hoist housing, said eye portion having an upset end for spring locking such screw means.

4. In combination, an electric hoist including a hollow housing, a cylindrical component disposed interiorly of said housing, and a mounting device holding said component in a predetermined position interiorly of said housing, said mounting device comprising a spring wire member having a circularly shaped body portion formed by a single convolution embracing a cylindrical side wall of said component, said member terminating at one end in a laterally bent guide portion extending along said side wall and terminating in an inwardly bent tip end portion overhanging one end of said component, the other end of said wire member being extended from said body portion and terminating in a bent eye portion engaged by means mounting said device firmly against said hoist housing.

5. A mounting device for holding a generally cylindrical component in a predetermined position interiorly of a hollow housing of an electric hoist, said mounting device comprising a one-piece member of spring wire having a generally circularly shaped body portion formed by a single convolution defining the general plane of said member and adapted to embrace a side wall portion of such a generally cylindrical component, said member terminating at one end in a guide portion laterally bent into a plane at generally a right angle to said general plane to extened along such a side wall portion, said guide portion terminating in a tip end portion bent into a plane generally parallel to said general plane, the other end of said member projecting generally tangentially from said body portion and terminating in a bent eye formation for receiving a fastener for mounting said member to such a hoist housing, the end portion of said eye formation being upset from the remainder thereof to function as a spring lock for such fastening means.

References Cited in the file of this patent
UNITED STATES PATENTS

| | | |
|---|---|---|
| 506,682 | Ferris | Oct. 17, 1893 |
| 1,708,799 | Norwood | Apr. 9, 1929 |
| 1,795,605 | Hyde | Mar. 10, 1931 |
| 2,266,660 | Sloan | Dec. 16, 1941 |
| 2,392,242 | Goepfrich | Jan. 1, 1946 |
| 2,520,855 | Rehwald | Aug. 29, 1950 |